Patented June 25, 1946

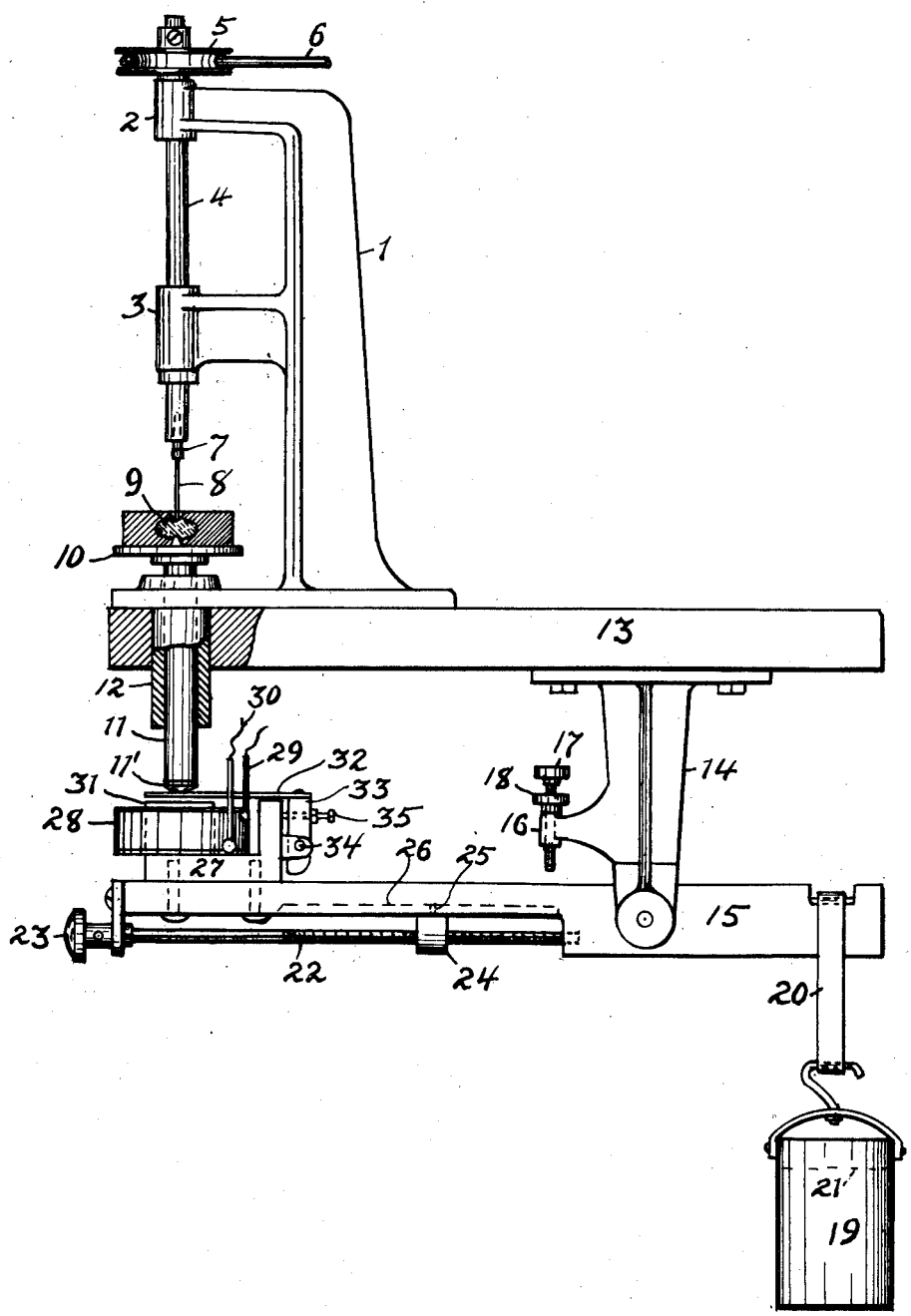

2,402,831

UNITED STATES PATENT OFFICE 2,402,831

MACHINE FOR PIERCING REFRACTORY BODIES

Winfield C. Moses, Fort Wayne, Ind., assignor to Otis G. Ferrier, Fort Wayne, Ind.

Application December 23, 1943, Serial No. 515,339

3 Claims. (Cl. 125—30)

This invention relates to improvements in machines for piercing refractory bodies, such as are used in the manufacture of wire drawing dies, and particularly for making a die opening or bore of a definite diameter through the axis of a die body disposed in a surrounding encasement therefor.

Customarily, in boring die bodies a tool or nib is rotated and axially reciprocated by an arbor to which it is attached, the arrangement being such that the nib has impact with the die body upon each downstroke of the arbor accompanied by more or less force because of the weight and momentum of the arbor. Such action generally tends to cause the nib to buckle or spring out of true axial alinement with the arbor or meander about the point of contact with the die body, which frequently results in mutilation of the die body or unintended enlargement of the bore being made therein.

Apparatus generally used for this purpose is provided with means of adjustment for progressing the nib during the boring operation necessitating frequent manipulation and more or less constant attention of the operator in order to maintain the nib in effective engagement with the die body. After each adjustment has been made the grinding operation between the nib and die body progresses with decreasing effectiveness necessitating readjustment in order to restore the nib and body to proper engaging relation with each other.

One of the objects of the instant invention is to afford a die body piercing machine wherein an arbor provided with a grinding tool or nib is mounted for rotation about its axis, and a die body support, alined with the axis of the arbor, is provided with mechanism for vibrating the support toward and from the arbor and to concurrently urge the support toward the piercing tool with more or less force under control by the operator.

Another object of the invention is to afford in a die body piercing machine in which a rotating arbor provided with a piercing tool is used in conjunction with a support for holding a die body for engagement with the tool, a mechanism for causing vibrations of high frequency between the tool and die body at the point of contact with each other and concurrently to urge contact therebetween under a constant selected pressure automatically maintained throughout the piercing operation, thus to attain uniformity in the grinding operation without requirement of frequent manipulated adjustment.

And another object of the invention is to provide in a die body piercing machine means by which a grinding tool and a die body as it is being pierced by the tool are automatically held at a constant selected pressure in operating engagement with each other throughout the piercing action.

Other objects and advantages of the invention appear in the following description.

An illustrative embodiment of the invention is shown in the accompanying drawing which is a side elevational view of an apparatus in which the invention is incorporated, parts being shown in section.

The invention consists of a structure including a standard 1 having bearings 2—3 in which is mounted for rotation an arbor 4 having a pulley 5 thereon actuated by a belt 6 that is connected with any suitable source of power (not shown). In the lower end of the arbor is secured a chuck 7 provided with a grinding tool or nib 8 preferably consisting of a wire the diameter of which closely approximates that of the bore to be made in an encased die body 9 that is mounted upon a suitable support 10 disposed in axial alinement with the arbor having a stem 11 that extends loosely through a guide 12 in the standard so as to have axial movement therein.

The standard is mounted upon a bench 13 from which depends a hanger 14 in which is pivotally secured a teeter-bar 15. The hanger has an arm 16 having therein a threaded bolt 17 provided with a lock-nut 18 for securing the bolt in adjusted positions in the arm. The lower end of the bolt has engagement with the teeter-bar wherefore to limit upward movement thereof. The rear end of the teeter-bar has pendently connected therewith a counterbalance 19 by means of a yielding member such as a spring or rubber band 20. The counterbalance preferably consists of a bucket containing a quantity of ballast 21, such as shot or sand, in sufficient quantity to insure upward movement of the outer end of the teeter-bar.

In connection with the forward end portion of the teeter-bar is arranged a threaded operating rod 22 provided at its outer end with a knob 23 by which the rod is adjustably turned, and upon said rod is secured a balancing weight 24, there being a pin 25 on the weight that projects loosely into an elongated slot 26 made in the teeter-bar whereby to prevent rotation of the weight. By turning the rod in one direction or the other the weight is moved longitudinally forward or backward with respect to the teeter-bar effecting the balance thereof upon its pivotal support.

Upon the outer end portion of the teeter-bar is mounted a vibrator, preferably electrically operated and which is of any suitable construction. As an example, the vibrator shown has an electro-magnetic base 27 provided with an electrical coil 28 that is energized by alternating current supplied from any suitable source (not shown) through conductors 29—30 connected therewith. The base has a core 31 that extends upwardly through the coil and disposed over the upper end of the core, suitably spaced therefrom, is a reed 32 supported at one of its ends by a block 33 that is pivotally mounted on the base as indicated by 34. The block is provided with an adjusting screw 35 the inner end of which bears against the base so that by turning the screw the space between the reed and the core is adjustably varied. When the coil is energized the reed is magnetically attracted causing more or less vertical vibratory movement thereof. The vibrator is located on the teeter-bar so the free end portion of the reed bears upwardly against the lower end of the stem 11 of the support 10. In this manner the weight of the support and its stem together with the encased die body 9 thereon is borne by the reed, so that when the vibrator is energized the die body and its support become agitated by high frequency vibrations due to the action of the reed.

If desired, the support 10 and its stem 11 may be made of material of light weight, such as aluminum, to facilitate the vibratory action. In such event the lower end of the stem may be provided with a tip 11' composed of iron which causes magnetic adherence with the reed when the vibrator is energized. In this manner responsiveness of the support and its load to the vibratory action of the reed is enhanced.

In operating the invention an encased die body 9 is centered upon the support 10 in axial alinement with the piercing tool 8, and is secured thereon in the usual manner. The counter-balance is then loaded with ballast sufficiently to cause the forward end of the teeter-bar to rise in opposition to the weight of the support and the die body thereon so that the die body is brought into contact with the end of the tool 8. It is preferable, especially when the bore to be made in the die body is of exceedingly small diameter and the tool is correspondingly slender, that the pressure of the die body against the contacting tool is sufficiently slight as to obviate buckling of the tool. The pressure is modified selectively upon shifting the balancing weight adjustably by manipulating the rod 22. In this manner the pressure of the die body against the tool is limited and maintained constantly at a selected degree according to adjustment of the balancing weight. Upon energizing the vibrator, the downward swing of the reed tends to ease the pressure of the die body against the tool while the reactionary upward swing of the reed causes impact of the body against the tool with abrading effect. As in the usual practice, the piercing operation is facilitated by the presence of fine abrasive dust accumulated between the opposing faces of the die body and tool at the point of impact.

During operation of the apparatus the teeter-bar 15 is tilted by force of the counterbalance 19 causing upward urge of the support 10 through the medium of the vibrator independently with respect to the action of the reed. By adjustment of the balancing weight 24 the urge imparted to the support by tilting action of the teeter-bar is varied accordingly. Upon energizing the vibrator vertical vibrations are imparted to the support 10 by action of the reed 32 which are accompanied concurrently by corresponding recoil of the teeter-bar. Such movement of the teeter-bar, occasioned by recoil thereof is absorbed by the yielding member 20 by which the teeter-bar and counterbalance are connected. In this manner the independent upward urge imparted to the die body support by the tilting movement of the teeter-bar is constant and undisturbed by action of the vibrator. This is a valuable feature of the invention.

By the arrangement herein set forth the die body is automatically maintained in soft touch with the piercing tool, broken only by the high frequency vibratory action of the reed, throughout the piercing operation, and thus the wearing away of the opposing faces of the die body and tool is substantially continuous and rapid which is advantageous and requires only slight attendance upon the part of the operator.

Variations from the particular construction above disclosed may be resorted to by the exercise of skill in the art, without departure from the scope of the invention, and the following claims are intended to be inclusive of such variations.

What I claim is:

1. In a die body piercing apparatus, an arbor mounted for rotation having actuating means therefor and provided at one of its ends with a piercing tool, a die body support mounted for axial movement alined with said arbor, a pivotally supported teeter-bar provided at one end thereof with a counterbalance that has a yielding connection therewith, a high frequency vibrator mounted on the opposite end of said teeter-bar provided with energizing means therefor and having operating engagement with said support, and an adjustable balancing weight arranged in connection with said teeter-bar, said teeter bar being adapted to urge axial movement of said support, through the medium of said vibrator, toward said tool more or less according to adjustment of said weight.

2. In a die body piercing apparatus, an arbor mounted for rotation having actuating means therefor and provided at one of its ends with a piercing tool, an axially movable support for a die body alined with said arbor, a pivotally supported teeter-bar, a high frequency vibrator having energizing means therefor, mounted on one end portion of said teeter-bar and having engagement with said support adapted to impart axial high frequency vibrations thereto, a counterbalance, for said teeter-bar including a vibration absorbing means connected therewith wherefore to yieldingly urge axial movement of said support toward said tool through the medium of said vibrator, and an adjustable balancing weight arranged in connection with said teeter-bar by which to vary the urging action thereof.

3. In a die body piercing apparatus, an arbor mounted for rotation having actuating means therefor and provided at one of its ends with a piercing tool, an axially movable support for a die body alined with said arbor, a pivotally supported teeter-bar, a high frequency vibrator having energizing means therefor, mounted on one end portion of said teeter-bar and adapted to impart axial vibratory movement thereto, a counterbalance having vibration absorbing means connected therewith adapted to urge axial movement of said support toward said tool through the medium of said vibrator.

WINFIELD C. MOSES.